March 24, 1931.  H. H. GLASIER  1,797,501
POWER ACTUATED FURROW DETACHER
Filed April 15, 1929  2 Sheets-Sheet 2
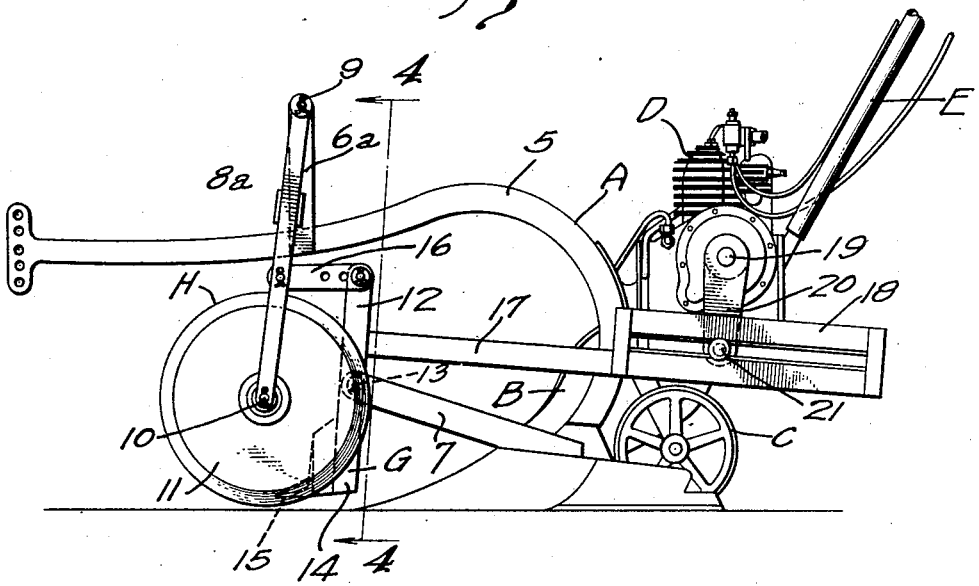
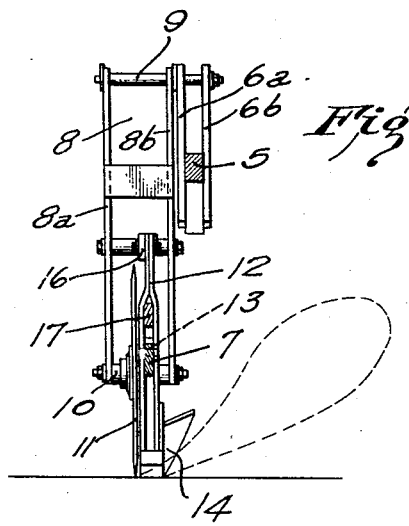
INVENTOR
Harold H. Glasier
By Westall and Wallace
ATTORNEYS Patented Mar. 24, 1931

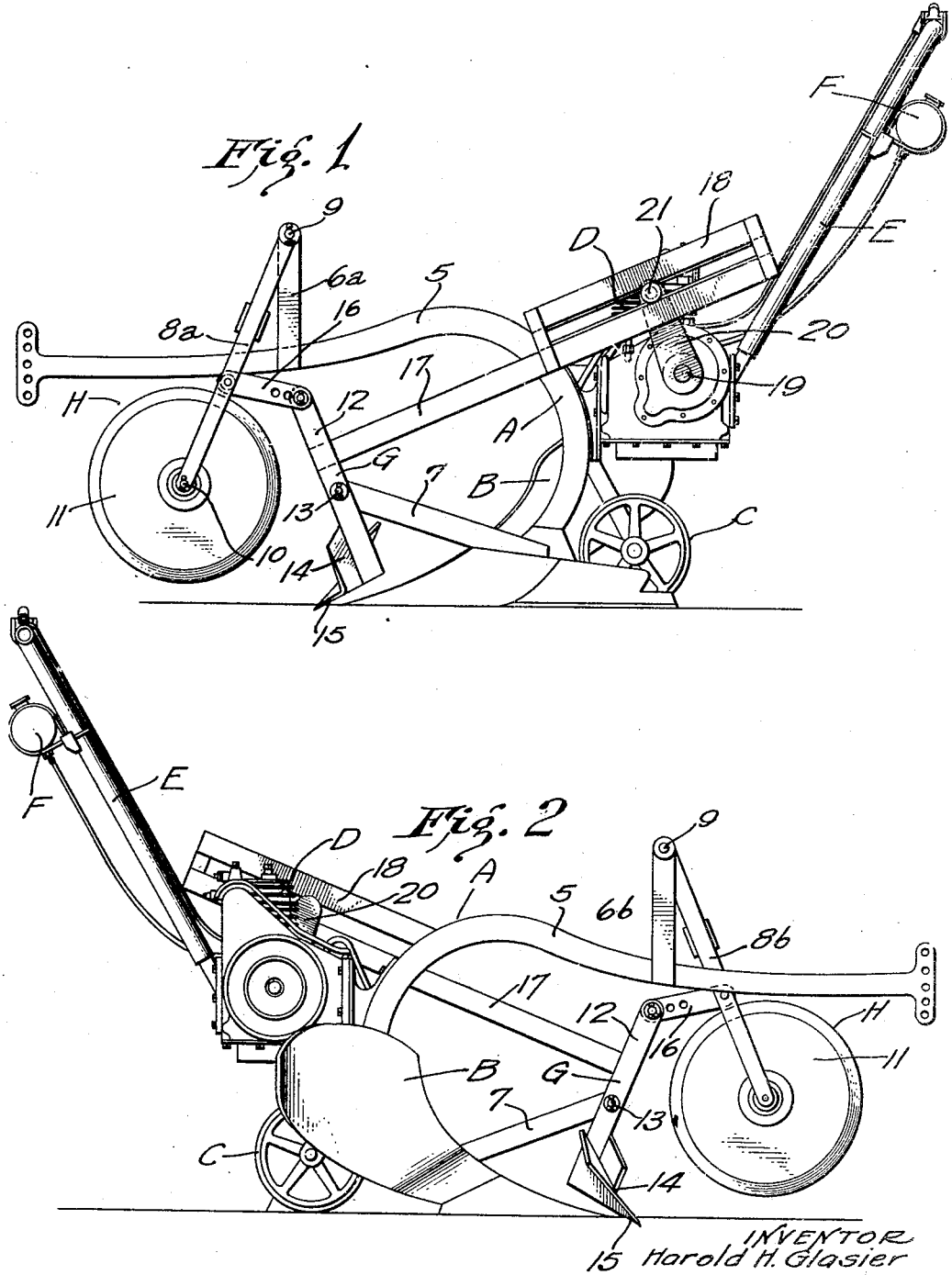

1,797,501

UNITED STATES PATENT OFFICE

HAROLD H. GLASIER, OF LOS ANGELES, CALIFORNIA

POWER-ACTUATED FURROW DETACHER

Application filed April 15, 1929. Serial No. 355,078.

This invention relates to an attachment to open the ground and adapted for plows to more effectively detach the furrow in advance of the plow point. As is well known, the plows in common use are provided with a coulter stationary with respect to the plow frame and which opens the ground in advance of the plow share so as to detach furrow. In hard ground, a tractive effort of great magnitude is required to draw the plow. The present invention appertains to a plow having a novel furrow detacher which is power actuated and breaks the ground in advance of the plow point. It is well known that an impact or picking action is more effective in breaking open the ground than a simple slicing or cutting action.

The present invention has for its objects the provision of a furrow detacher including any or all of the following features: a reciprocable coulter; a combined reciprocable coulter and reciprocable cutter movable to and from each other whereby to decrease the dragging action of the coulter on the plow; a combined reciprocable coulter and reciprocable cutter together with means for actuating the coulter and cutter; and features of design contributing to strength, simplicity, durability and compactness of structure.

These objects together with other objects and corresponding accomplishments are obtained by means of the embodiment of my invention illustrated in the accompanying drawings, in which:—

Fig. 1 is a side view of a plow equipped with my furrow detacher and with the cutter and coulter in their remote positions; Fig. 2 is a side elevation of the plow shown in Fig. 1 as seen from the opposite side thereof; Fig. 3 is a side elevation of the plow corresponding to that shown in Fig. 1 but with the coulter and cutter in near position; and Fig. 4 is a section as seen on the line 4—4 of Fig. 3.

Referring more particularly to the drawings, A marks a frame on which is mounted a plow share B. The rear of the plow share is a gauge wheel C. Mounted on the frame is a gas engine D for operating the coulter and cutter. Handles E are provided for guiding the plow. F is a gasoline tank. A reciprocable coulter is marked G and is disposed in advance of the plow share, and cooperating with the coulter is a cutter H.

Referring more in detail to the drawings, the frame comprises a beam 5 serving as a draft beam. Upstanding from the beam 5 and fixed thereto by any suitable means such as welding is a standard. In the structure shown, the standard consists of two bars, one on each side of the beam as best shown in Fig. 4 and marked therein 6a and 6b. Fixed to the frame and extending forwardly is an arm 7 serving as a pivotal bearing support for the coulter. Pivotally hung from the upper end of the standard is a lever frame 8 comprising spaced bars indicated in Fig. 4 by 8a and 8b. A pivot shaft 9 connects the lever frame and the standard. Spanning the side bars of the lever frame at the lower end is an axle 10 serving as a journal for a cutter disk 11. A bifurcated lever 12 for the coulter is pivotally secured to the arm 7 at 13. At the lower end of the lever arm 12 is a coulter shoe 14 having a spur 15. A link arm 16 connects the upper end of the coulter lever arm 12 and the cutter lever frame. Fixed to the coulter lever 12 is an actuating arm 17 having a scotch yoke 18 at the rear end. The motor or gas engine D rotates a shaft 19 provided with a crank arm 20 having a crank pin 21 disposed in the slot of the yoke 18.

In operation, the plow is drawn by horses, a tractor or any well known means and is guided by means of the handles E in the usual manner. The motor D is started and causes oscillation of the lever arm 12 about its pivotal axis 13 so as to reciprocate the coulter shoe and spur with an impact or picking action. The shoe being wedge shaped transversely breaks open the furrow. Swinging movement is transmitted to the lever frame through the intermediate link arm 16 and causes the cutter disk to be reciprocated to and from the coulter. The cutter disk and coulter react against one another so that no drag is added to the plow. The cutter disk 11 makes an incision or cut while the coulter shoe opens up the cuts so made for entrance of the plow point. Both the cutter disk 11 and the coulter shoe perform the function of the usual plow coulters, but much more effectively, and are operated by power not derived from the tractive effort upon the plow. What has been termed herein as the coulter shoe pierces into the cut made by the disk cutter, roots open the ground and wedges the furrow slice away from the land and in general shatters it. This lessens the piercing friction against the plow share and the bursting friction against the mould-board.

What I claim is:

1. An agricultural tool comprising a plow share, a coulter shoe reciprocable to break the furrow in advance of the share, and mechanism to reciprocate the coulter shoe.

2. An agricultural tool comprising a plow share, a coulter shoe having a spur disposed in advance of the plow point and reciprocable in the path of plow travel, and mechanism to reciprocate the coulter shoe to break open the furrow.

3. An agricultural tool comprising a frame, a plow share, a coulter shoe having a spur disposed in advance of the plow point, said coulter shoe having a lever arm pivotally mounted on said frame whereby said coulter shoe may be reciprocated in the path of plow travel, an actuating arm secured to said coulter shoe, and mechanism to oscillate said actuating arm and thereby to reciprocate said coulter shoe to break open the furrow.

4. An agricultural tool comprising a frame, a plow share, a coulter shoe having a spur disposed in advance of the plow point, said coulter shoe being pivotally mounted on said frame whereby said coulter shoe may be reciprocated in the path of plow travel and mechanism to oscillate said coulter shoe and thereby to reciprocate said coulter shoe to break open the furrow.

5. An agricultural tool comprising a frame, a plow share, a coulter shoe having a spur disposed in advance of the plow point, said coulter shoe having a lever arm pivotally mounted on said frame whereby said coulter shoe may be reciprocated in the path of plow travel, an actuating arm secured to said coulter shoe, a motor mechanism mounted on said frame having a crank, and means connecting said crank and actuating arm whereby to reciprocate said coulter shoe to break open the furrow.

6. An agricultural tool comprising a frame, a plow share, a coulter having a spur disposed in advance of the plow point, said coulter having a lever arm pivotally mounted on said frame whereby said spur may be reciprocated in the path of plow travel, an actuating arm secured to said coulter, a motor mechanism mounted on said frame having a crank and crank pin, a yoke on said actuating arm in which said crank pin is disposed whereby on revolution of said crank said actuating arm will be oscillated and thereby said spur reciprocated.

7. An agricultural tool comprising a plow share, a coulter reciprocable to break the furrow in advance of the share, mechanism to reciprocate the coulter, a cutter disposed in advance of said coulter and mounted to be reciprocated to and from said coulter, said cutter being operatively connected to said mechanism.

8. An agricultural tool comprising a plow share, a coulter having a spur disposed in advance of the plow point and reciprocable in the path of the plow travel, mechanism to reciprocate the coulter, a cutter disposed in advance of said coulter and mounted to be reciprocated to and from said coulter in the path of travel of said plow share, said cutter being operatively connected to said mechanism.

9. An agricultural tool comprising a frame, a plow share, a coulter having a spur disposed in advance of the plow point, said coulter being pivotally mounted on said frame whereby said spur may be reciprocated in the path of plow travel, a cutter pivotally mounted on said frame in advance of said coulter, said cutter being connected to said mechanism to be reciprocated to and from said spur and to cause slicing of the ground.

10. An agricultural tool comprising a frame, a plow share, a coulter having a spur disposed in advance of the plow point, said coulter having a lever arm pivotally mounted on said frame whereby said coulter may be reciprocated in the path of plow travel, an actuating arm secured to said coulter, mechanism to oscillate said actuating arm and thereby to reciprocate said spur, a cutter pivotally mounted on said frame in advance of said coulter, said cutter being connected to said mechanism to be reciprocated to and from said spur and cause slicing of the ground.

11. An agricultural tool comprising a frame, a plow share, a coulter having a spur disposed in advance of the plow point, said coulter having a lever arm pivotally mounted on said frame whereby said coulter may be reciprocated in the path of plow travel, an actuating arm secured to said coulter, mechanism to oscillate said actuating arm and thereby to reciprocate said spur, a cutter pivotally mounted on said frame in advance of said spur, a link arm connecting said lever arm to said cutter, and motor mechanism mounted on said frame and connected to said lever arm to oscillate the latter, said link arm being disposed so as to cause said coulter and cutter to be moved to and from each other.

12. An agricultural tool comprising a frame, a plow share, a coulter having a spur disposed in advance of the plow point, said coulter being pivotally mounted on said frame whereby said coulter may be reciprocated in the path of plow travel, mechanism to oscillate said coulter and thereby to reciprocate said spur, a cutter disk, a cutter arm on which said disk is journalled, said arm being pivotally mounted on said frame in advance of said coulter and connected to said mechanism to be reciprocated to and from said coulter to cause slicing of the ground.

13. An agricultural tool comprising a frame, a coulter having a spur and provided with a lever arm pivotally mounted on said frame whereby said spur may be reciprocated in the path of travel of said tool, an actuating arm secured to said coulter, a motor mechanism mounted on said frame having a crank and crank pin, a yoke on said actuating arm in which said crank pin is disposed whereby on revolution of said crank said actuating arm will be oscillated and thereby said spur reciprocated.

14. An agricultural tool comprising a frame, a coulter having a spur and provided with a lever arm pivotally mounted on said frame whereby said coulter may be reciprocated in the path of travel of said tool, an actuating arm secured to said coulter, mechanism to oscillate said actuating arm and thereby to reciprocate said spur, a cutter pivotally mounted on said frame in advance of said spur, a link arm connecting said lever arm to said cutter, and motor mechanism mounted on said frame and connected to said lever arm to oscillate the latter, said link arm being disposed so as to cause said coulter and cutter to be moved to and from each other.

15. An agricultural tool comprising a frame, a coulter having a spur, said coulter being pivotally mounted on said frame whereby said coulter may be reciprocated in the path of travel of said tool, mechanism to oscillate said coulter and thereby to reciprocate said spur, a cutter disk, a cutter arm on which said disk is journalled, said arm being pivotally mounted on said frame in advance of said coulter and connected to said mechanism to be reciprocated to and from said coulter to cause slicing of the ground.

In witness that I claim the foregoing I have hereunto subscribed my name this 7th day of March, 1929.

HAROLD H. GLASIER.